(12) United States Patent
Choi et al.

(10) Patent No.: US 12,094,272 B2
(45) Date of Patent: Sep. 17, 2024

(54) VEHICLE AND CONTROL METHOD THEREOF

(71) Applicants: HYUNDAI MOTOR COMPANY, Seoul (KR); KIA CORPORATION, Seoul (KR)

(72) Inventors: Sunho Choi, Hwaseong-si (KR); Sang Jae Han, Hwaseong-si (KR); Changseob Lim, Suwon-si (KR); Sungtae Kim, Seoul (KR); Han Young Park, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 393 days.

(21) Appl. No.: 17/524,404

(22) Filed: Nov. 11, 2021

(65) Prior Publication Data

US 2022/0198843 A1    Jun. 23, 2022

(30) Foreign Application Priority Data

Dec. 23, 2020    (KR) .................. 10-2020-0182231

(51) Int. Cl.
*G07C 5/08*   (2006.01)
*B60K 35/28*  (2024.01)
(Continued)

(52) U.S. Cl.
CPC ............ *G07C 5/0825* (2013.01); *H01M 6/50* (2013.01); *B60K 35/28* (2024.01);
(Continued)

(58) Field of Classification Search
None
See application file for complete search history.

(56) References Cited

U.S. PATENT DOCUMENTS

| 2015/0311736 A1* | 10/2015 | Park | B60L 58/21 320/103 |
| 2015/0355287 A1* | 12/2015 | Murase | G01R 31/386 324/434 |

(Continued)

FOREIGN PATENT DOCUMENTS

| CN | 106114426 A | * 11/2016 | ......... B60R 16/0232 |
| CN | 110103773 A | * 8/2019 | ............. B60L 58/12 |

(Continued)

*Primary Examiner* — Amelia Vorce
(74) *Attorney, Agent, or Firm* — Lempia Summerfield Katz LLC (57) ABSTRACT

Disclosed are a vehicle in which battery state information, battery history information, and specific state information are displayed on a display, and a control method of the vehicle. The vehicle includes a sensor unit to detect information of a battery, a display, and a controller which determines battery aging information based on an output voltage of the battery, determines battery charging information based on an output current of the battery, the output voltage of the battery, and a temperature of the battery, determines battery history information based on a voltage change of the battery, a current change of the battery, and a temperature change of the battery, and determines a battery state score and a battery history score, to determine whether to display the battery state information and the battery history information on the display.

14 Claims, 5 Drawing Sheets

(51) Int. Cl.
*H01M 6/50* (2006.01)
*H01M 10/42* (2006.01)

(52) U.S. Cl.
CPC .. *B60K 2360/169* (2024.01); *B60K 2360/178* (2024.01); *H01M 2010/4271* (2013.01); *H01M 2010/4278* (2013.01); *H01M 2220/20* (2013.01)

(56) References Cited

U.S. PATENT DOCUMENTS

| | | | |
|---|---|---|---|
| 2018/0001744 A1* | 1/2018 | Vehr | B60H 1/005 |
| 2018/0022299 A1* | 1/2018 | Han | B60R 16/033 |
| | | | 701/36 |
| 2020/0101865 A1* | 4/2020 | Tsurutani | B60L 58/16 |
| 2020/0254899 A1* | 8/2020 | Uchida | B60L 3/0046 |
| 2020/0355748 A1* | 11/2020 | Akaishi | G01R 31/3842 |
| 2021/0013731 A1* | 1/2021 | Choe | B60L 53/00 |
| 2021/0053439 A1* | 2/2021 | Kazuno | B60K 35/29 |
| 2021/0097785 A1* | 4/2021 | Zhang | G01R 31/3277 |
| 2021/0190869 A1* | 6/2021 | Morishima | H01M 10/48 |
| 2022/0155381 A1* | 5/2022 | Jo | G01R 31/367 |

FOREIGN PATENT DOCUMENTS

| | | | | |
|---|---|---|---|---|
| CN | 110341550 A | * | 10/2019 | B60L 58/14 |
| CN | 110515005 A | * | 11/2019 | G01R 31/382 |
| CN | 110696680 A | * | 1/2020 | B60L 58/24 |
| KR | 20180007035 A | * | 1/2018 | B60L 11/18 |

* cited by examiner

VEHICLE AND CONTROL METHOD THEREOF

CROSS-REFERENCE TO RELATED APPLICATION(S)

This application claims priority to and the benefit of Korean Patent Application No. 10-2020-0182231, filed on Dec. 23, 2020, the entire contents of which are incorporated herein by reference.

BACKGROUND

1. Field

The present disclosure relates to a vehicle in which battery slate information, battery history information, and specific state information of a battery are displayed on a display, and a control method of the vehicle.

2. Description of the Related Art

The statements in this section merely provide background information related to the present disclosure and may not constitute prior art.

Recently, research related to batteries has been actively conducted. As cost reduction and efficiency of battery-related hardware are emerging as important issues, recently, companies in the vehicle industry are actively conducting research on improving batteries, and in particular, research related to the cost reduction is being actively conducted. In particular, in the case of batteries, there are many problems in terms of battery utilization due to occurrence of a dark current, and accidents due to the discharge of the battery while driving occur frequently.

Therefore, research on preventing accidents in advance by visually observing battery usage status, history status, etc. to determine battery status and imprinting the need for this on a user is also being conducted.

As a battery-related research, not only the research on a primary battery and a secondary battery, but also blocking the occurrence of the dark current that may occur in various situations, as well as the research on technology that effectively communicates a state of a battery to a user, are being actively conducted in the vehicle industry.

SUMMARY the present disclosure provides a vehicle in which battery state information, battery history information, and specific state information are displayed on a display, and a control method of the vehicle.

Additional aspects of the present disclosure are set forth below in part in the description, should be obvious from the description, or may be learned by practice of the present disclosure.

In accordance with an aspect of the present disclosure, a vehicle includes: a sensor unit provided to detect an output of a battery, a display, and a controller which determines battery aging information based on an output voltage of the battery obtained through the sensor unit, determines battery charging information based on an output current of the battery, the output voltage of the battery, and a temperature of the battery obtained through the sensor unit, determines battery history information based on a voltage change of the battery, a current change of the battery, and a temperature change of the battery obtained through the sensor unit, determines a battery state score in which a state of the battery is quantified using battery state information including the battery aging information and the battery charging information, determines a battery history score in which a change amount in the state of the battery is quantified using the battery history information, compares the battery state score and the battery history score with a first predetermined value and a second predetermined value, respectively, and displays the battery state information and the battery history information on the display when the battery state score is less than the first predetermined value and the battery history score is less than the second predetermined value.

The vehicle may further include a storage unit provided to store specific state reference information relating to a dark current, wherein the controller may determine whether a state of the vehicle corresponds to a specific state based on the specific state reference information when a dark current exceeding a predetermined current is detected in the vehicle through the sensor unit after ignition of the vehicle is turned off and a predetermined time is elapsed, and may control to display information corresponding to the specific state on the display after the ignition of the vehicle is turned on when the state of the vehicle corresponds to the specific state.

The vehicle may further include a communication unit provided to obtain an in-vehicle signal, wherein the controller may determine whether the state of the vehicle corresponds to the specific state based on the specific state reference information when the ignition of the vehicle is turned off and a signal is obtained through the communication unit, and may control to display the information corresponding to the specific state on the display after the ignition of the vehicle is turned on when the state of the vehicle corresponds to the specific state.

The controller may determine that the battery is in a dangerous state and control to display a warning message, the battery state information, and the battery history information on the display when the battery state score is equal to or greater than the first predetermined value.

The controller may determine that the battery is in a dangerous state and control to display a warning message, the battery state information, and the battery history information on the display when the battery history score is equal to or greater than the second predetermined value.

The battery history information may include charge history information of the battery and discharge history information of the battery.

When at least one of following occurs: the battery state score is equal to or greater than the first predetermined value; the battery history score is equal to or greater than the second predetermined value; or the battery is in a specific state determined based on a dark current of the battery, the controller may control to display an interface that receives a charging input from a user, the battery state information, and the battery history information on the display.

In accordance with an aspect of the disclosure, a control method of a vehicle includes: determining, by a controller, battery aging information based on an output voltage of a battery obtained through a sensor unit; determining, by the controller, battery charging information based on an output current of the battery, an output voltage of the battery, and a temperature of the battery obtained through the sensor unit; determining, by the controller, battery history information based on a voltage change of the battery, a current change of the battery, and a temperature change of the battery obtained through the sensor unit; determining, by the controller, a battery state score in which a state of the battery is quantified using battery state information including the battery aging information and the battery charging information; determining, by the controller, a battery history score in which a change amount in the state of the battery is quantified using the battery history information, comparing the battery state score and the battery history score with a first predetermined value and a second predetermined value, respectively; and displaying, on a display, the battery state information and the battery history information when the battery state score is less than the first predetermined value and the battery history score is less than the second predetermined value.

The control method may further include: determining, by the controller, whether a state of the vehicle corresponds to a specific state based on specific state reference information stored in a storage unit when a dark current exceeding a predetermined current is detected through the sensor unit after ignition of the vehicle is turned off and a predetermined time is elapsed; and controlling, by the controller, to display information corresponding to the specific state on the display after the ignition of the vehicle is turned on when the state of the vehicle corresponds to the specific state.

The controlling to display the information corresponding to the specific state on the display may include determining whether the state of the vehicle corresponds to the specific state based on the specific state reference information when the ignition of the vehicle is turned off and a signal is obtained through a communication unit, and displaying the information corresponding to the specific state on the display after the ignition of the vehicle is turned on when the state of the vehicle corresponds to the specific state.

The control method may further include: determining, by the controller, that the battery is in a dangerous state when the battery state score is equal to or greater than the first predetermined value and controlling to display a warning message, the battery state information, and the battery history information on the display.

The control method may further include determining, by the controller, that the battery is in a dangerous state when the battery history score is equal to or greater than the second predetermined value and controlling to display a warning message, the battery state information, and the battery history information on the display.

The battery history information may include charge history information of the battery and discharge history information of the battery.

The control method may further include controlling to display an interface that receives a charging input from a user, the battery state information, and the battery history information on the display when at least one of following occurs: the battery state score is equal to or greater than the first predetermined value; the battery history score is equal to or greater than the second predetermined value; or the battery is in a specific state determined based on a dark current of the battery.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Like reference numbers refer to like elements throughout this specification. This specification does not describe all components of the embodiments, and general contents in the technical field to which the disclosure belongs or overlapping contents between the embodiments are not be described. The terms "portion," "module," "member," and "block" as used herein, may be implemented as software or hardware, and according to embodiments, a plurality of "portions," "modules," "members," or "blocks" may be implemented as a single component, or a single "portion," "module," "member," or "block" may include a plurality of components.

Throughout this specification, when a portion is "connected" to another portion, this includes the case in which the portion is indirectly connected to the other portion, as well as the case in which the portion is directly connected to the other portion, and the indirect connection includes a connection through a wireless communication network.

Also, it should be understood that the terms "includes," "comprises," "including," and/or "comprising," when used in this specification, specify the presence of a stated component, but do not preclude the presence or addition of one or more other components.

In the present disclosure, it should also be understood that when an element is referred to as being "on" or "over" another element, it may be directly on the other element or intervening elements may also be present.

It should be understood that, although the terms first, second, etc. may be used herein to describe various components, these components should not be limited by these terms. These terms are only used to distinguish one component from another.

It is to be understood that the singular forms "a," "an," and "the" include plural referents unless the context clearly dictates otherwise.

In each step, an identification numeral is used for convenience of explanation, the identification numeral does not describe the order of the steps, and each step may be performed differently from the order specified unless the context clearly states a particular order.

Hereinafter, the present disclosure is described in detail with reference to the accompanying drawings.

Figure 1:
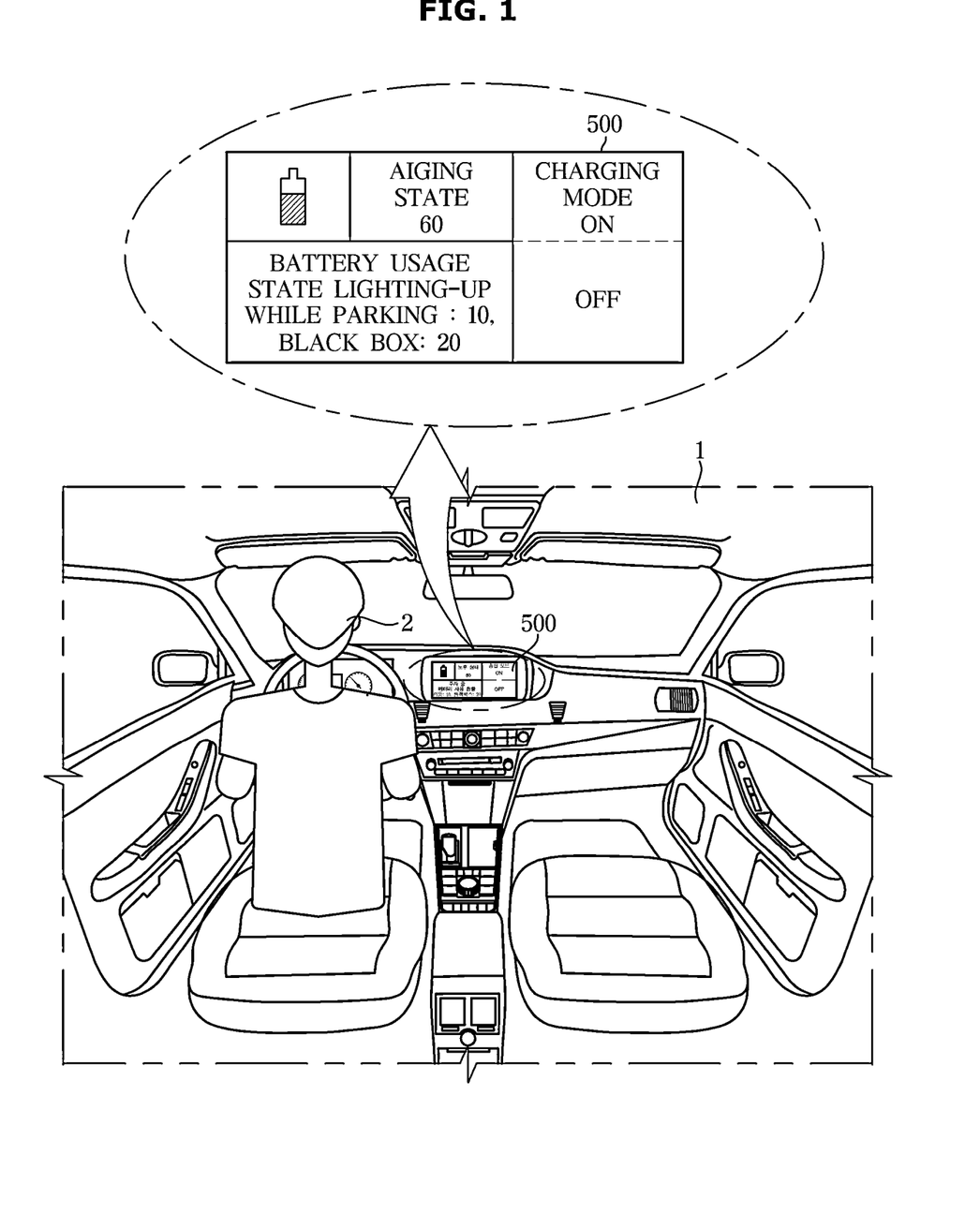
FIG. 1 is a view illustrating an operation of displaying battery state information, battery history information, and charging mode selection information on a display according to an embodiment.
Figure 2:
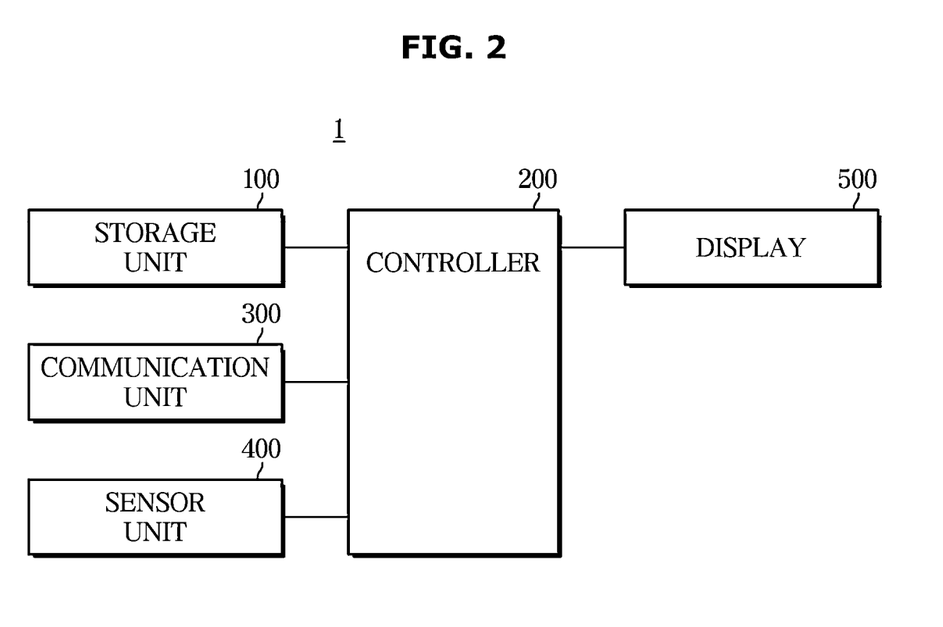
FIG. 2 is a control block diagram of a vehicle according to an embodiment.

FIG. 1 is a view illustrating an operation of displaying battery state information, battery history information, and charging mode selection information on a display according to an embodiment, and FIG. 2 is a control block diagram of a vehicle according to an embodiment.

Referring to FIGS. 1 and 2, a vehicle 1 may include a sensor unit 400 provided to detect an output of a battery, a display 500, and a controller 200 controlling to determine battery aging information based on an output voltage of the battery obtained through the sensor unit 400, determine battery charging information based on an output current of the battery, an internal resistance of the battery, the output voltage of the battery, and a temperature of the battery obtained through the sensor unit 400, determine battery history information based on a voltage change of the battery, a current change of the battery, and a temperature change of the battery obtained through the sensor unit 400, determine a battery state score in which a state of the battery is quantified using battery state information including the aging information of the battery and the charging information of the battery, determine a battery history score in which a change amount in the state of the battery is quantified using the battery history information, compare the battery state score and the battery history score with a first predetermined value and a second predetermined value, respectively, and display the battery state information and the battery history information on the display 500 when the battery state score is less than the first predetermined value and the battery history score is less than the second predetermined value. The amount of change in the state of the battery may refer to a change in the state of the battery, such as a change in a battery temperature, a change in the output current of the battery, a change in the output voltage of the battery, a change in an aging of the battery, and a change in a charge amount of the battery.

The sensor unit 400 may detect the output of the battery. Specifically, the sensor unit 400 may include an intelligent battery sensor (IBS). The sensor unit 400 may obtain and count the output voltage of the battery, the output current of the battery, the temperature of the battery, charging/discharging time of the battery, and the like. The controller 200 may determine a charge degree of the battery based on the output voltage of the battery, the output current of the battery, the temperature of the battery, and the like through the sensor unit 400. The charge degree of the battery may indicate a degree at which electrical energy is stored in the battery. The charge degree may typically have a value from 0 to 100% and may indicate a degree at which the battery is charged between a fully discharged state and a fully charged state. The charge degree of the battery may be calculated based on an open circuit voltage (OCV) of the battery and an input/output current of the battery.

For example, the sensor unit 400 may determine the internal resistance of the battery based on the output voltage and the output current of the battery when an engine is started. Also, the sensor unit 400 may determine the aging information of the battery based on the internal resistance of the battery and the charging/discharging time of the battery. The aging information may typically have a value between 0 and 100% and may indicate a degree at which the battery is aged between a fully aged state (0%) and a completely new state (100%). The sensor unit 400 may detect a drop in the output voltage of the battery when the vehicle 1 is started, and may determine the internal resistance of the battery based on the drop in the output voltage. The sensor unit 400 may determine the aging information of the battery based on the charging/discharging time of the battery, the temperature of the battery, the internal resistance of the battery, and the like. In this case, the aging information may include a state of health (SoH). The charging information of the battery may include a state of charge (SoC) of the battery. The sensor unit 400 may generate battery data such as the charging information of the battery and the aging information of the battery based on the output voltage of the battery, the output current of the battery, and the temperature of the battery.

Quantifying the battery state and quantifying the change amount in battery state may be set experimentally or empirically or using machine learning and may be determined by an algorithm or a calculation method. The battery state information, which refers to the current state of the battery, may refer to the output current, output voltage, temperature of the battery, and the aging degree of the battery, and may also refer to an overall state of the battery. The battery state change information may refer to a state change trend of the battery and may include all information about a change in the state of the battery. The first predetermined value and the second predetermined value may be set empirically or empirically or using machine learning.

The controller 200 may control to determine that the battery is in a dangerous state when the battery state score is equal to or greater than the first predetermined value and display a warning message, the battery state information and the battery history information on the display 500, and may control to determine that the battery is in the dangerous state when the battery history score is equal to or greater than the second predetermined value and display the warning message, the battery state information and the battery history information on the display 500. The battery history information may include charge history information of the battery and discharge history information of the battery. When it is determined to be at least one of the case where the battery state score is equal to or greater than the first predetermined value, the case where the battery history score is equal to or greater than the second predetermined value, and a case where it is determined that the battery is in a specific state, the controller 200 may control to display an interface that receives a charging input from a user 2, the battery state information, and the battery history information on the display 500. The vehicle 1 may include a storage unit 100 and a communication unit 300. The communication unit 300 may refer to a device for detecting and obtaining an internal signal. The storage unit 100 may store specific state reference information of the vehicle.

The communication unit 300 may include one or more components that enable communication with an external device, and may include, for example, at least one of a short-range communication module, a wired communication module, and a wireless communication module.

The short-range communication module may include various short-range communication modules that transmit and receive signals using a wireless communication network in a short distance such as a Bluetooth module, an infrared communication module, an RHO (Radio Frequency Identification) communication module, a WLAN (Wireless Local Access Network) communication module, an NFC communication module, and a Zigbee communication module.

The wired communication module may include various wired communication modules such as a LAN (Local Area Network) module, a WAN (Wide Area Network) module, and a VAN (Value Added Network) module, as well as various cable communication modules such as a USB (Universal Serial Bus), an HDMI (High Definition Multimedia Interface), a DVI (Digital Visual Interface), an RS-232

(recommended standard 232), power line communication, and a POTS (plain old telephone service).

The wireless communication module, in addition to the Wi-Fi module and the wireless broadband module, may include wireless communication modules supporting various wireless communication methods such as a GSM (Global System for Mobile Communication), a COMA (Code Division Multiple Access), a WCDMA (Wideband Code Division Multiple Access), a UMTS (Universal Mobile Telecommunications System), a TDMA (Time Division Multiple Access), and LTE (Long Term Evolution).

The wireless communication module may include a wireless communication interface including an antenna and a transmitter for transmitting a signal. The wireless communication module may further include a signal conversion module for modulating a digital control signal output from the controller 200 through a wireless communication interface in response to the control of the controller 200 into an analog-type wireless signal. The wireless communication module may include a wireless communication interface including an antenna and a receiver for receiving a signal. In addition, the wireless communication module may further include a signal conversion module for demodulating an analog-type wireless signal received through the wireless communication interface into a digital control signal.

The storage unit 100 may be implemented as at least one of a non-volatile memory device such as a cache, a ROM (Read Only Memory), a PROM (Programmable ROM), an EPROM (Erasable Programmable ROM), an EEPROM (Electrically Erasable Programmable ROM), and a flash memory, a volatile memory device such as a RAM (Random Access Memory), and a storage medium such as a HDD (hard disk drive) and a CD-ROM, but is not limited thereto. The storage unit 100 may be a memory implemented as a separate chip from the processor described above in relation to the controller, and may be implemented as a single chip with the processor.

The display 500 may include a cathode ray tube (CRT), a digital light processing (DLP) panel, a plasma display panel, a liquid crystal display (LCD) panel, an electro luminescence (EL) panel, an electrophoretic display (EPD) panel, an electrochromic display (ECD) panel, a light emitting diode (LED) panel or an organic light emitting diode (OLED) panel. However, the disclosure is not limited thereto.

An input unit may include a hardware device such as various buttons or switches, a pedal, a keyboard, a mouse, a track-ball, various levers, a handle, a stick, and the like for the user's input.

The input unit may also include a graphical user interface (GUI) such as a touch pad for the user's input, that is, a software device. The touch pad may be implemented as a touch screen panel (TSP) to form a layered structure with the display.

When the display is composed of the touch screen panel (TSP) forming a layer structure with the touch pad, the display may also be used as an input unit.

The controller 200 is a processor that controls overall operations of the vehicle and may be a processor of an electronic control unit (ECU) that controls overall operations of a power system. The controller 200 may control operations of various modules and devices installed in the vehicle. According to an embodiment, the controller 200 may generate control signals for controlling various modules and devices installed in the vehicle to control an operation of each component.

The controller 200 may include a memory in which a program for performing the operations described above and to be described later and various data related thereto are stored, and a processor executing the program stored in the memory. The controller 200 may be integrated into a system on chip (SOC) installed in the vehicle and may be operated by the processor. However, only one of the system-on-chip is not installed in the vehicle, but a plurality of the system-on-chips may be installed, and thus the controller 200 is not limited to being integrated into only one system-on-chip.

The controller 200 may be implemented through at least one type of storage medium among a memory type (flash memory type), a hard disk type, a multimedia card micro type, a card type memory (e.g., SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. However, the controller 200 is not limited thereto, and may be implemented as any other form known in the art.

Figure 3:
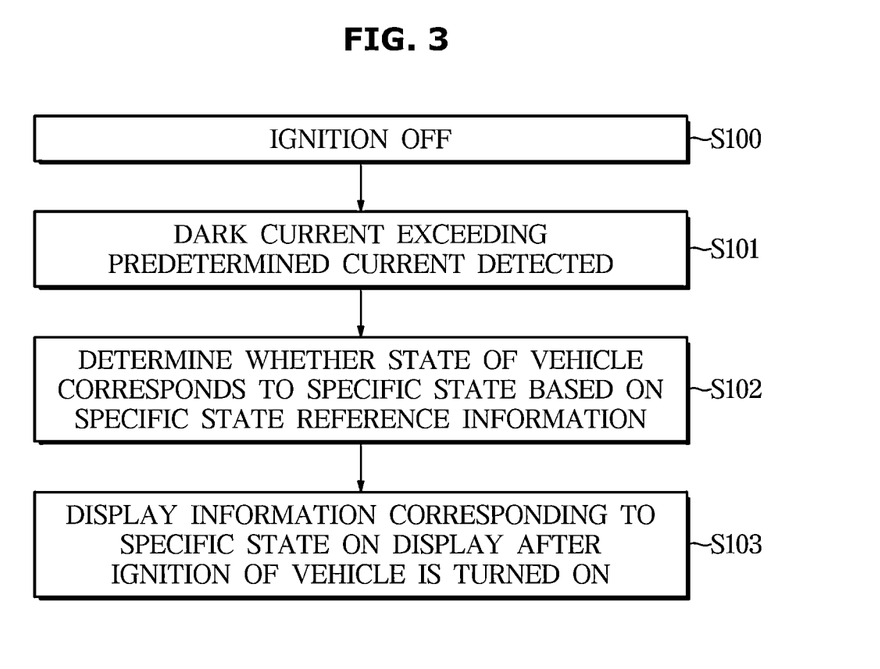
FIG. 3 is a flowchart illustrating an operation of displaying specific state information on the display according to an embodiment.

FIG. 3 is a diagram illustrating an operation of displaying specific state information on the display according to an embodiment.

Referring to FIG. 3, the vehicle may further include the storage unit for storing the specific state reference information, and the controller may control to determine whether a state of the vehicle corresponds to a specific state based on the specific state reference information (S102) when a dark current exceeding a predetermined current is detected in the vehicle through the sensor unit (S101) after the ignition of the vehicle is turned off (S100) and a predetermined time is elapsed, and then may control to display information corresponding to the specific state on the display after the ignition of the vehicle is turned on (S103). The vehicle may further include a communication unit for obtaining a signal in the vehicle, and the controller may control to determine whether the state of the vehicle corresponds to the specific state based on the specific state reference information when the ignition of the vehicle is turned off and a signal is obtained through the communication unit, and may control to display information corresponding to the specific state on the display after the ignition of the vehicle is turned on when the state of the vehicle corresponds to the specific state. The communication unit may refer to a device that performs an in-vehicle communication function. The specific state reference information may refer to reference information for determining whether the state of the vehicle corresponds to the specific state. For example, whether the state of the vehicle corresponds to the specific state may mean that the dark current measured in the battery exceeds the predetermined current and is obtained and mean that the dark current in an in-vehicle device in addition to the battery exceeds the predetermined current and is obtained. The predetermined current may be set empirically or empirically or using machine learning. In a light-sensitive device [e.g., a device that generates a current when irradiated with light, for example, a photomultiplier tube (PMT), a photodiode, and a charge coupled device (CCD)], a very weak current may occur even when light is not actually lit, and the dark current may refer to a weak current that may be generated even in such a dark state. For example, when the current measured in the battery is higher than in a normal case after the ignition of the vehicle is turned off, it may be determined that the dark current is occurring. In this case, the current corresponding to the normal case may be the predetermined current. In a state in which the ignition of the vehicle is turned off, a signal that should not be detected may be detected, and in this case, it may be determined that the dark current is occurring.

Figure 4:
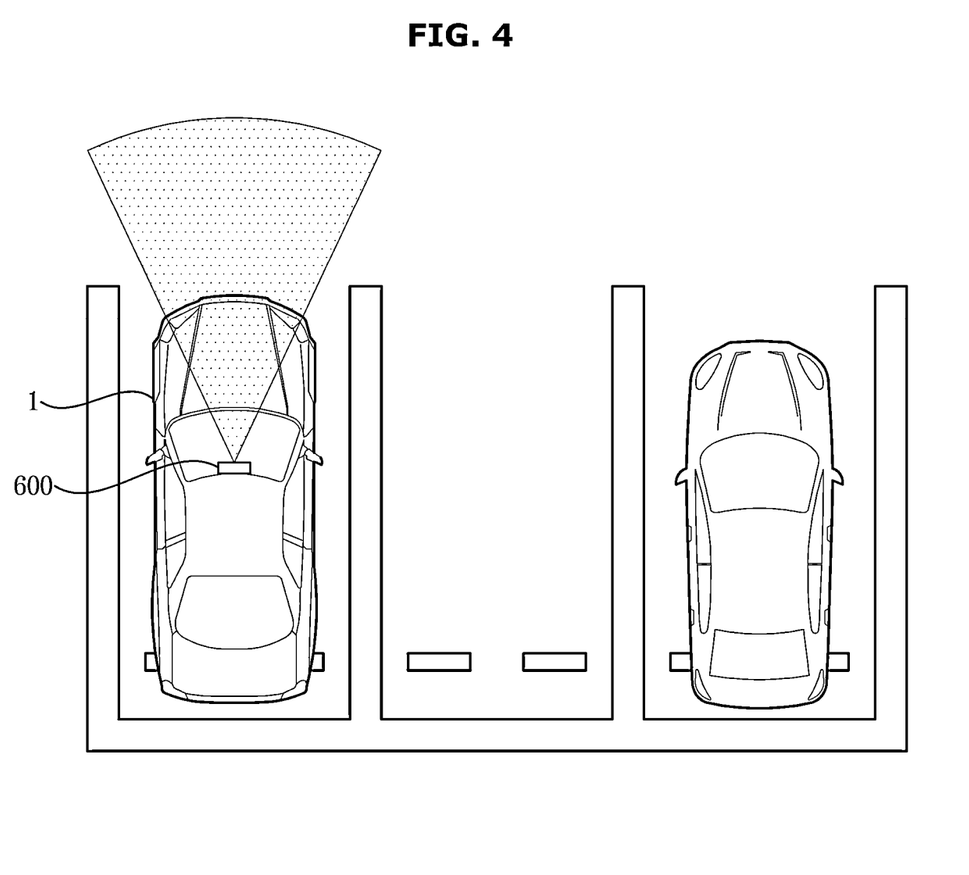
FIG. 4 is a view illustrating an operation in which a specific state occurs in a state in which the ignition of the vehicle is turned off according to an embodiment.

FIG. 4 is a view illustrating an operation in which a specific state occurs in a state in which the ignition of the vehicle is turned off according to an embodiment.

Referring to FIG. 4, as described above, in the state that the ignition of the vehicle 1 is turned off, a signal that should not normally be detected may be detected, and the dark current may be occurring. For example, even after the ignition of the vehicle 1 is turned off, a black box 600 may be always turned on. In this case, the dark current may occur due to the use of the black box 600, and this case may be regarded as the specific state. In addition, even after the ignition of the vehicle 1 is turned off, the dark current may occur as a lamp continues to be turned on. In addition, the dark current may occur in the vehicle 1 in various situations, and thus a case corresponding to the specific state may occur.

Figure 5:
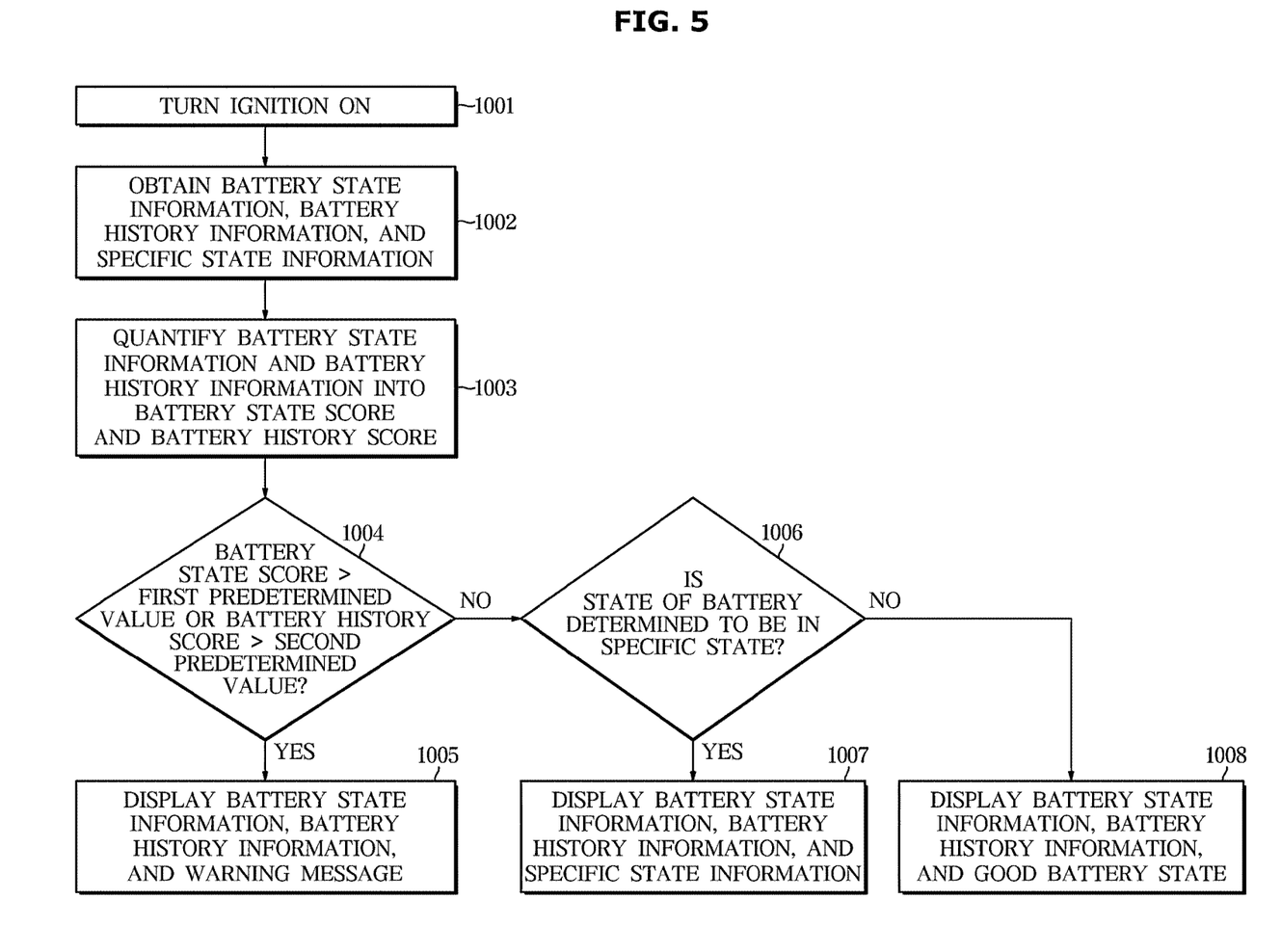
FIG. 5 is a flowchart illustrating a control method according to an embodiment.

FIG. 5 is a flowchart according to an embodiment.

Referring to FIG. 5, after the ignition of the vehicle is turned on (in step 1001), the vehicle obtains battery state information, battery history information, and specific state information (in step 1002). The method of obtaining the battery specific state information is the same as described above. After the battery state information and the battery history information are obtained, the battery state information and the battery history information may be quantified into a battery state score and a battery history score (in step 1003). The quantification method is the same as described above. Thereafter, it is determined whether the battery state score is greater than the first predetermined value or the battery history score is greater than the second predetermined value (in step 1004), and when at least one of the two scores is greater than the corresponding predetermined value, the battery status information, the battery history information, and the warning message are displayed on the display (in step 1005).

In this case, in addition to the battery status information and battery history information, various information may be displayed on the display, such as the battery aging information, the battery temperature, the battery output voltage, the battery output current, the battery charging information, and the like. Also, the warning message may be displayed in various ways to alert the user to a danger. When the battery state score is less than the first predetermined value and the battery history score is less than the second predetermined value, it may be determined whether the state of the battery corresponds to the specific state (in step 1006). In this case, the order is not limited thereto, and it may be determined whether the state of the battery corresponds to the specific state. When it is determined that the battery is in the specific state, the battery state information, the battery history information, and the specific state information are all displayed on the display (in step 1007). To display the specific state information on the display may be to display the dark current occurrence situation, and may be to alert to a dangerous situation and whether charging is desired. When it is not determined to be in the specific state, the battery state information, the battery history information, and a good battery state may be displayed together on the display (in step 1008). The good battery indication may refer to indicating that the battery is good and may be set in various ways.

Herein, the disclosed embodiments may be implemented in the form of a recording medium storing instructions executable by a computer. The instructions may be stored in the form of program code, and when executed by a processor, a program module may be created to perform the operations of the disclosed embodiments. The recording medium may be implemented as a computer-readable recording medium.

The computer-readable recording medium includes various kinds of recording media in which instructions which may be decrypted by a computer are stored. For example, there may be a ROM (Read Only Memory), a RAM (Random Access Memory), a magnetic tape, a magnetic disk, a flash memory, an optical data storage device, and the like.

As is apparent from the above, a vehicle and a control method thereof according to an embodiment may alert a user to a danger and prevent sudden battery discharge by displaying battery state information, battery history information, and specific state information on a display.

While the disclosure has been particularly described with reference to exemplary embodiments, it should be understood by those of skilled in the art that various changes in form and details may be made without departing from the spirit and scope of the disclosure.

What is claimed is:

1. A vehicle comprising:
a sensor unit configured to detect an output of a battery;
a display; and
a controller configured to:
   determine battery aging information based on an output voltage of the battery obtained through the sensor unit,
   determine battery charging information based on an output current of the battery, the output voltage of the battery, and a temperature of the battery obtained through the sensor unit,
   determine battery history information based on a voltage change of the battery, a current change of the battery, and a temperature change of the battery obtained through the sensor unit,
   determine a battery state score in which a state of the battery is quantified using battery state information including the battery aging information and the battery charging information,
   determine a battery history score in which a change amount in the state of the battery is quantified using the battery history information,
   compare the battery state score and the battery history score with a first predetermined value and a second predetermined value, respectively, and
   display the battery state information and the battery history information on the display when the battery state score is less than the first predetermined value and the battery history score is less than the second predetermined value.

2. The vehicle according to claim 1, further comprising a storage unit configured to store specific state reference information relating to a dark current,
wherein the controller is configured to:
   determine whether a state of the vehicle corresponds to a specific state based on the specific state reference information when a dark current exceeding a predetermined current is detected in the vehicle through the sensor unit after ignition of the vehicle is turned off and a predetermined time is elapsed, and
   control to display information corresponding to the specific state on the display after the ignition of the vehicle is turned on when the state of the vehicle corresponds to the specific state.

3. The vehicle according to claim 2, further comprising a communication unit configured to obtain an in-vehicle signal,
wherein the controller is configured to:
  determine whether the state of the vehicle corresponds to the specific state based on the specific state reference information when the ignition of the vehicle is turned off and a signal is obtained through the communication unit, and
  control to display the information corresponding to the specific state on the display after the ignition of the vehicle is turned on when the state of the vehicle corresponds to the specific state.

4. The vehicle according to claim 1, wherein the controller is configured to determine that the battery is in a dangerous state and control to display a warning message, the battery state information, and the battery history information on the display when the battery history score is equal to or greater than the second predetermined value.

5. The vehicle according to claim 1, wherein the battery history information comprises charge history information of the battery and discharge history information of the battery.

6. The vehicle according to claim 3, wherein the controller is configured to control to display an interface that receives a charging input from a user, the battery state information, and the battery history information on the display when at least one of following occurs:
  the battery state score is equal to or greater than the first predetermined value;
  the battery history score is equal to or greater than the second predetermined value; or
  the battery is in a specific state determined based on a dark current of the battery.

7. The vehicle according to claim 1, wherein the controller is configured to determine that the battery is in a dangerous state and control to display a warning message, the battery state information, and the battery history information on the display when the battery state score is equal to or greater than the first predetermined value.

8. A control method of a vehicle, comprising:
  obtaining, through a sensor unit, an output voltage of a battery, an output current of the battery, and a temperature of the battery;
  determining, by a processor, battery aging information based on the output voltage of the battery obtained through the sensor unit;
  determining, by the processor, battery charging information based on the output current of the battery, the output voltage of the battery, and the temperature of the battery obtained through the sensor unit;
  determining, by the processor, battery history information based on a voltage change of the battery, a current change of the battery, and a temperature change of the battery obtained through the sensor unit;
  determining, by the processor, a battery state score in which a state of the battery is quantified using battery state information including the battery aging information and the battery charging information;
  determining, by the processor, a battery history score in which a change amount in the state of the battery is quantified using the battery history information;
  comparing, by the processor, the battery state score and the battery history score with a first predetermined value and a second predetermined value, respectively;
  determining, by the processor, whether a dark current occurs in the vehicle in response to a determination that the battery state score and the battery history score are less than the first predetermined value and the second predetermined value, respectively; and
  displaying, on a display, the battery state information and the battery history information when the battery state score is less than the first predetermined value and the battery history score is less than the second predetermined value.

9. The control method according to claim 8, further comprising:
  determining, by the processor, whether a state of the vehicle corresponds to a specific state based on specific state reference information stored in a storage unit when the dark current exceeding a predetermined current is detected through the sensor unit after ignition of the vehicle is turned off and a predetermined time is elapsed; and
  controlling, by the processor, to display information corresponding to the specific state on the display after the ignition of the vehicle is turned on when the state of the vehicle corresponds to the specific state.

10. The control method according to claim 9, wherein the controlling to display the information corresponding to the specific state on the display comprises:
  determining whether the state of the vehicle corresponds to the specific state based on the specific state reference information when the ignition of the vehicle is turned off and a signal is obtained through a communication unit; and
  displaying the information corresponding to the specific state on the display after the ignition of the vehicle is turned on when the state of the vehicle corresponds to the specific state.

11. The control method according to claim 8, further comprising:
  determining, by the processor, that the battery is in a dangerous state when the battery history score is equal to or greater than the second predetermined value and controlling to display a warning message, the battery state information, and the battery history information on the display.

12. The control method according to claim 8, wherein the battery history information comprises charge history information of the battery and discharge history information of the battery.

13. The control method according to claim 10, further comprising:
  controlling, by the processor, to display an interface that receives a charging input from a user, the battery state information, and the battery history information on the display when at least one of following occurs:
    the battery state score is equal to or greater than the first predetermined value;
    the battery history score is equal to or greater than the second predetermined value; or
    the battery is in a specific state determined based on the dark current of the battery.

14. The control method according to claim 8, further comprising:
  determining, by the processor, that the battery is in a dangerous state when the battery state score is equal to or greater than the first predetermined value and controlling to display a warning message, the battery state information, and the battery history information on the display.

\* \* \* \* \*